US008273681B2

(12) United States Patent
Naito et al.

(10) Patent No.: US 8,273,681 B2
(45) Date of Patent: Sep. 25, 2012

(54) EXHAUST GAS PURIFYING CATALYST AND METHOD FOR MANUFACTURING THE SAME

(75) Inventors: Tetsuro Naito, Yokohama (JP);
Masanori Nakamura, Yokosuka (JP);
Hironori Wakamatsu, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/060,918

(22) PCT Filed: Jun. 8, 2009

(86) PCT No.: PCT/JP2009/060443
§ 371 (c)(1),
(2), (4) Date: Feb. 25, 2011

(87) PCT Pub. No.: WO2010/026814
PCT Pub. Date: Mar. 11, 2010

(65) Prior Publication Data
US 2011/0160049 A1   Jun. 30, 2011

(30) Foreign Application Priority Data

Sep. 2, 2008 (JP) ................................. 2008-224272

(51) Int. Cl.
*B01J 23/00* (2006.01)
*B01J 21/00* (2006.01)
*B01J 20/00* (2006.01)

(52) U.S. Cl. ........ 502/328; 502/302; 502/303; 502/304; 502/326; 502/327; 502/330; 502/332; 502/334; 502/339; 502/340; 502/341; 502/344; 502/349; 502/355; 502/415; 502/439; 502/527.12; 502/527.13

(58) Field of Classification Search .......... 502/302–304, 502/326–328, 330, 332, 334, 339, 340, 341, 502/344, 349, 355, 415, 439, 527.12, 527.13
See application file for complete search history.

(56) References Cited

U.S. PATENT DOCUMENTS

| 5,814,576 | A | 9/1998 | Yamamoto |
| 6,896,857 | B2 | 5/2005 | Nakamura et al. |
| 7,446,076 | B2 * | 11/2008 | Miyoshi et al. ............... 502/327 |
| 7,498,288 | B2 * | 3/2009 | Matsueda et al. ............ 502/325 |
| 7,517,510 | B2 * | 4/2009 | Chen et al. ................. 423/213.2 |

(Continued)

FOREIGN PATENT DOCUMENTS

JP   2003-320252 A   11/2003

(Continued)

*Primary Examiner* — Cam N. Nguyen
(74) *Attorney, Agent, or Firm* — Foley & Lardner LLP (57) ABSTRACT

An exhaust gas purifying catalyst includes: rhodium; a zirconium-containing oxide which supports rhodium, and comprises: at least one element selected from the group consisting of calcium, lanthanum, cerium, neodymium and yttrium; and zirconium; and a NOx absorbing material comprising at least one selected from the group consisting of magnesium, barium, sodium, potassium and cesium. A degree of dispersion of rhodium is 20% or more after baking at 900° C. in air for three hours. A method for manufacturing the exhaust gas purifying catalyst includes: mixing the zirconium-containing oxide with water, thereby preparing an aqueous liquid of the zirconium-containing oxide; and supporting rhodium on the zirconium-containing oxide by mixing the aqueous liquid of the zirconium-containing oxide with an aqueous solution of a rhodium salt. A pH of a mixed liquid of the aqueous solution of the rhodium salt and the aqueous liquid of the zirconium-containing oxide is adjusted to 7 or more.

7 Claims, 1 Drawing Sheet

U.S. PATENT DOCUMENTS

| | | | |
|---|---|---|---|
| 7,547,656 B2 * | 6/2009 | Miura | 502/327 |
| 7,550,124 B2 * | 6/2009 | Chen et al. | 423/213.2 |
| 7,585,611 B2 * | 9/2009 | Kato et al. | 430/270.1 |
| 7,585,811 B2 * | 9/2009 | Nakamura et al. | 502/327 |
| 7,601,669 B2 * | 10/2009 | Nakamura et al. | 502/326 |
| 7,601,670 B2 * | 10/2009 | Yasuda et al. | 502/439 |
| 7,605,108 B2 * | 10/2009 | Wakamatsu et al. | 502/326 |
| 7,608,561 B2 * | 10/2009 | Miyoshi et al. | 502/326 |
| 7,618,919 B2 * | 11/2009 | Shimazu et al. | 502/439 |
| 7,622,096 B2 * | 11/2009 | Deeba et al. | 423/213.2 |
| 7,625,836 B2 * | 12/2009 | Matsueda et al. | 502/325 |
| 7,638,460 B2 * | 12/2009 | Nakamura et al. | 502/326 |
| 7,674,744 B2 * | 3/2010 | Shiratori et al. | 502/327 |
| 7,713,911 B2 * | 5/2010 | Wakamatsu et al. | 502/332 |
| 7,737,077 B2 * | 6/2010 | Kitamura et al. | 502/326 |
| 7,754,171 B2 * | 7/2010 | Chen et al. | 423/213.2 |
| 7,758,834 B2 * | 7/2010 | Chen et al. | 423/213.2 |
| 7,759,278 B2 * | 7/2010 | Matsueda et al. | 502/302 |
| 7,767,163 B2 * | 8/2010 | LaBarge et al. | 422/171 |
| 7,795,172 B2 * | 9/2010 | Foong et al. | 502/327 |
| 7,811,962 B2 * | 10/2010 | Hu et al. | 502/304 |
| 7,833,930 B2 * | 11/2010 | Kikuchi et al. | 502/304 |
| 7,879,755 B2 * | 2/2011 | Wassermann et al. | 502/304 |
| 7,923,407 B2 * | 4/2011 | Goto | 502/327 |
| 7,956,005 B2 * | 6/2011 | Matsueda et al. | 502/302 |
| 7,977,276 B2 * | 7/2011 | Kikuchi et al. | 502/325 |
| 7,985,706 B2 * | 7/2011 | Okada et al. | 502/216 |
| 7,998,896 B2 * | 8/2011 | Kitamura et al. | 502/326 |
| 8,007,750 B2 * | 8/2011 | Chen et al. | 423/239.1 |
| 8,026,193 B2 * | 9/2011 | Miura | 502/304 |
| 8,038,951 B2 * | 10/2011 | Wassermann et al. | 422/168 |
| 8,052,936 B2 * | 11/2011 | Harada et al. | 422/177 |
| 8,080,494 B2 * | 12/2011 | Yasuda et al. | 502/327 |
| 2003/0207759 A1 | 11/2003 | Nakamura et al. | |
| 2007/0265160 A1 | 11/2007 | Kawabata et al. | |
| 2009/0280978 A1 * | 11/2009 | Nakamura et al. | 502/303 |

FOREIGN PATENT DOCUMENTS

| | | |
|---|---|---|
| JP | 2005-305217 A | 11/2005 |
| JP | 2007-252996 A | 10/2007 |
| JP | 2007-301530 A | 11/2007 |
| WO | WO 2008/097702 A1 | 8/2008 |

* cited by examiner

EXHAUST GAS PURIFYING CATALYST AND METHOD FOR MANUFACTURING THE SAME

TECHNICAL FIELD

The present invention relates to an exhaust gas purifying catalyst and a method for manufacturing the catalyst. More specifically, the present invention relates to an exhaust gas purifying catalyst suitable for purifying nitrogen oxide (NOx) in exhaust gas emitted from a lean-burn engine and the like while reducing the used amount of noble metal, and having a resistance to deterioration of a purification performance even after being subjected to load, and relates to a method for manufacturing the catalyst.

BACKGROUND ART

In recent years, in consideration of oil resource depletion and global warming, better vehicle fuel consumption has been increasingly demanded. In particular, a lean-burn vehicle has been desired. A catalyst used in such a lean-burn vehicle is required to have a function to purify nitrogen oxide (NOx) under an excess oxygen atmosphere. However, a conventional three-way catalyst does not sufficiently purify nitrogen oxide because of an influence of the presence of excessive oxygen. Therefore, a catalyst capable of purifying nitrogen oxide in a lean range in which oxygen is excessively present has been required. Conventionally, a so-called lean NOx trap catalyst that traps and purifies nitrogen oxide in the lean range has been proposed (for example, refer to Patent Document 1).

CITATION LIST

Patent Literature

Patent Document 1: Japanese Patent Unexamined Publication No. 2007-301530

DISCLOSURE OF INVENTION

Technical Problem

However, in such a conventional lean NOx trap catalyst, there was a problem that a catalyst performance was deteriorated because of a decrease of an active surface area of noble metal since an aggregation of noble metal as a catalyst component was promoted after a duration test.

The present invention has been devised in view of such conventional problems. It is an object of the present invention to provide an exhaust gas purifying catalyst having a resistance to deterioration of a catalyst performance even after being subjected to load while reducing the used amount of the catalyst component.

Solution to Problem

It is a first aspect of the present invention to provide an exhaust gas purifying catalyst comprising: rhodium; a zirconium-containing oxide which supports rhodium, and comprises: at least one element selected from the group consisting of calcium, lanthanum, cerium, neodymium and yttrium; and zirconium; and a NOx absorbing material comprising at least one selected from the group consisting of magnesium, barium, sodium, potassium and cesium, wherein a degree of dispersion of rhodium is 20% or more after baking at 900° C. in air for three hours.

It is a second aspect of the present invention to provide a method for manufacturing an exhaust gas purifying catalyst comprising: mixing a zirconium-containing oxide that comprises: at least one element selected from the group consisting of calcium, lanthanum, cerium, neodymium and yttrium; and zirconium with water, thereby preparing an aqueous liquid of the zirconium-containing oxide; and supporting rhodium on the zirconium-containing oxide by mixing the aqueous liquid of the zirconium-containing oxide with an aqueous solution of a rhodium salt, wherein a pH of a mixed liquid of the aqueous solution of the rhodium salt and the aqueous liquid of the zirconium-containing oxide is adjusted to 7 or more.

DESCRIPTION OF EMBODIMENTS

The following is a specification of an exhaust gas purifying catalyst according to the present invention. The exhaust gas purifying catalyst according to the present invention includes rhodium (Rh), a zirconium-containing oxide supporting rhodium thereon, and a NOx absorbing material. In the catalyst, a degree of dispersion of rhodium is 20% or more after baking at 900° C. in air for three hours.

The NOx absorbing material may be any elements as long as it can absorb nitrogen oxide (NOx) in a lean range in which fuel is leaner than a stoichiometric air-fuel ratio, and can release NOx in a stoichiometric range (a stoichiometric air-fuel ratio range) or a rich range in which fuel is richer than the stoichiometric air-fuel ratio. Specific examples of the NOx absorbing material to be used include magnesium (Mg), barium (Ba), sodium (Na), potassium (K) or cesium (Cs), and an arbitrary mixture of those.

As for the zirconium-containing oxide, an oxide containing calcium (Ca), lanthanum (La), cerium (Ce), neodymium (Nd) or yttrium (Y), and an arbitrary mixture of those, and zirconium (Zr) can be used. In particular, lanthanum-added zirconia (La—$ZrO_2$) in which lanthanum is added to zirconia ($ZrO_2$) is preferably used.

The reasons to utilize the zirconium-containing oxide in the present invention are as follows. First, as a mechanism for an aggregation of noble metal such as rhodium, (1) an aggregation caused by a migration of noble metal due to heat, and (2) an aggregation of noble metal caused by an aggregation of a carrier per se on which noble metal is supported, are known. Conventionally, in order to prevent the aggregation (1), alumina ($Al_2O_3$) having a large surface area was used as a noble metal carrier so that noble metal particles were preliminarily widely separated from each other. However, it has been recognized that a catalyst activity of rhodium is deteriorated due to the aggregation of noble metal caused by the aggregation of alumina or solution of rhodium in alumina. Thus, in order to prevent the solution of rhodium in alumina, zirconia ($ZrO_2$) has been used. However, a mutual aggregation of zirconia is easily caused since zirconia has a low heat resistance. As a result, the aggregation (2) is caused, and therefore, the catalyst activity of rhodium is deteriorated.

The present invention has been devised in view of the above-mentioned findings. Namely, a predetermined element such as lanthanum is added to zirconia ($ZrO_2$) so as to prevent the aggregation of zirconia. In addition, due to the addition of such a predetermined element, a grain boundary can be formed between zirconia particles. Moreover, the aggregation (1) is also prevented since rhodium can be present in the grain boundary stably. Therefore, the exhaust gas purifying catalyst according to the present invention can maintain rhodium on the surface of zirconium in a high dispersion state even after being subjected to load under a high temperature atmosphere. Accordingly, the deterioration of the catalyst activity after being subjected to load is significantly prevented.

As described above, the preferable element added to zirconia in the zirconium-containing oxide is calcium (Ca), lanthanum (La), cerium (Ce), neodymium (Nd) or yttrium (Y). Alternatively, these elements may be mixed and added to zirconia. The above-mentioned elements are preferably added to zirconia with a content ratio (Zr:additive element) of 99.5:0.5 to 95:5 in a molar basis. The particularly preferable element in the above-mentioned elements added to zirconia is lanthanum. This may be because a composite reaction between lanthanum and zirconia is promoted due to the addition of lanthanum, so that the aggregation of zirconia tends to be easily prevented. Lanthanum is preferably added to zirconia with a content ratio (Zr:La) of 99.5:0.5 to 95:5 in a molar basis. When the additive ratio of lanthanum is less than 0.5, the aggregation of zirconia may not be prevented sufficiently. On the other hand, when the additive ratio exceeds 5, an oxide of lanthanum and the like may be formed. As a result, a heat resistance of zirconia may be deteriorated.

Figure 1:
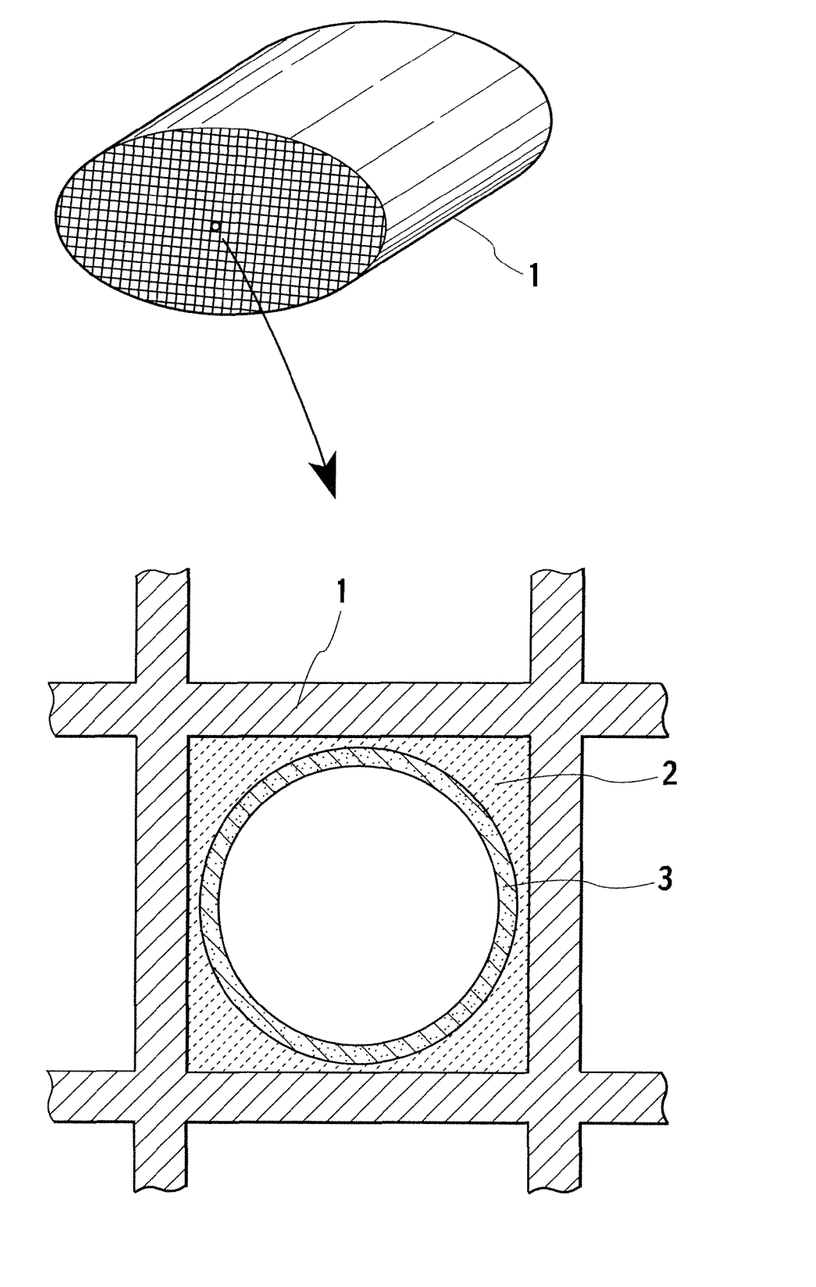
FIG. 1 is a perspective view and a partially enlarged view showing an exhaust gas purifying catalyst according to an embodiment of the present invention.

The exhaust gas purifying catalyst according to the present invention shown in FIG. 1 preferably includes rhodium such that the supported amount of rhodium is to be 3% by mass or less in catalyst layers 2 and 3 provided in a monolithic substrate 1. Due to such a small amount of rhodium to be supported, the rhodium particles, which are supported on the surface of the zirconium-containing oxide that is a carrier, can be widely separated from each other. Therefore, the degree of dispersion of rhodium can be improved. The supported amount of rhodium corresponds to ¾ to ½ of that in the conventional lean NOx trap catalyst. Accordingly, the present invention can achieve a reduction in cost.

With regard to the degree of dispersion of rhodium according to the present invention, first, the zirconium-containing oxide supporting rhodium thereon is baked at 900° C. in air for three hours. Then, the baked rhodium-supporting zirconium-containing oxide is placed in a metal dispersion measurement device to measure the absorption amount of carbon monoxide (CO) with respect to rhodium. Thus, the degree of dispersion can be obtained from the absorption amount of carbon monoxide according to the following formula (1). When the degree of dispersion is less than 20%, aggregates of noble metal are formed, and the active surface area is decreased. As a result, the catalyst activity is to be deteriorated.

$$\text{Degree of dispersion (\%)} = \frac{100 \times \text{supported metal atomic weight} \times \text{unit absorption amount}}{22414 \times \text{stoichiometric ratio} \times \text{supported metal content ratio}}$$

[Formula 1]

The exhaust gas purifying catalyst according to the present invention may contain other components other than rhodium, the zirconium-containing oxide and the NOx absorbing material. For example, the exhaust gas purifying catalyst may contain platinum (Pt) and cerium. In such a case, platinum to be used is preferably supported on a surface of an oxide containing cerium and aluminum. In addition, some or the entire platinum is preferably supported on surfaces of cerium particles.

The catalyst of the present invention contains platinum in addition to rhodium, so as to further improve the NOx purification rate. Moreover, platinum is effective to improve an oxidation performance of the catalyst. Therefore, when the exhaust gas purifying catalyst according to the present invention is used in a lean-burn engine, the exhaust gas purifying catalyst can effectively oxidize gas species, which are not consumed by a NOx reduction reaction, in hydrocarbons (HC), carbon monoxide (CO) and hydrogen ($H_2$) introduced as a reducing agent during a rich spike, so as to detoxify the gas species. In addition, by providing platinum on the surface of cerium, a chemical bond of Pt—O—Ce (platinum-oxygen-cerium) is formed. Accordingly, a migration of platinum due to heat is prevented, and therefore, the aggregation of platinum can be prevented.

The exhaust gas purifying catalyst according to the present invention may employ a so-called honeycomb substrate as a monolithic substrate, in which a catalyst layer having a single or multiple layer structure is formed. Specifically, as shown in FIG. 1, the catalyst layers 2 and 3 with a multiple layer structure may be formed within each cell in the honeycomb substrate 1. Although the catalyst layer shown in FIG. 1 has a double layer structure, the catalyst layer may be a single layer, or may have three or more layers.

When the exhaust gas purifying catalyst has a layer configuration with a plurality of catalyst layers, the content of cerium as ceria ($CeO_2$) contained in the whole catalyst layers is preferably 20 to 40% by mass, and the content of ceria contained in an outermost layer in the plurality of the catalyst layers is preferably 20 to 40% by mass with respect to the total content of ceria. Namely, in the exhaust gas purifying catalyst shown in FIG. 1, the content of cerium contained as ceria ($CeO_2$) in the catalyst layers 2 and 3 is preferably 20 to 40% by mass, and the content of ceria contained in the catalyst layer 3 of the outermost layer is preferably 20 to 40% by mass with respect to the total content of ceria contained in the catalyst layers 2 and 3. Due to such a layer configuration, the NOx purification rate can be further improved. When the content of ceria in the outermost layer exceeds 40% by mass, hydrocarbon (HC), carbon monoxide (CO) and hydrogen ($H_2$) introduced into the catalyst as a reducing agent may react with oxygen ($O_2$) released from ceria during the rich spike. As a result, the NOx purification performance may be deteriorated since the reducing agent is not used for the reduction reaction of nitrogen oxide. In particular, when the content of ceria in the outermost layer increases, the reducing agent released during the rich spike reacts with oxygen released from ceria present in the outermost layer. Thus, the reducing agent may not reach inside of the catalyst. On the other hand, when the content of ceria is less than 20% by mass, and when platinum is used as noble metal and alumina is used as a carrier, the content of platinum supported on ceria decreases while the content of platinum supported on alumina increases. Consequently, the chemical bond of platinum-oxygen-cerium may not be easily formed, and the aggregation of platinum may not be prevented sufficiently.

The exhaust gas purifying catalyst according to the present invention described above is preferably used in an internal combustion engine in which an exhaust gas condition is repeatedly shifted mainly from an oxygen excess atmosphere (a lean atmosphere) to a fuel excess atmosphere (a rich atmosphere) in which a reducing agent concentration is high. Particularly, the exhaust gas purifying catalyst of the present invention is preferably used in a lean-burn engine, a direct-injection engine and a diesel engine. Note that, the present invention does not eliminate the exhaust gas purifying catalyst used in an internal combustion engine to operate in a stoichiometric air-fuel ratio.

The following is a description of a method for manufacturing the exhaust gas purifying catalyst according to the present invention. In the manufacturing method, rhodium is supported on the zirconium-containing oxide by an impregnation method in which an aqueous solution of rhodium salt is mixed with an aqueous liquid of the zirconium-containing oxide. When supporting rhodium by the impregnation method, a pH of the mixed liquid of the aqueous solution of the rhodium salt and the aqueous liquid of the zirconium-containing oxide is controlled to be 7 or more. When the pH of the mixed liquid of the aqueous solution of the rhodium salt and the aqueous liquid of the zirconium-containing oxide is 7 or more, rhodium can be highly dispersed on the zirconium-containing oxide, so as to maintain the high dispersion degree for a long period of time even after being subjected to load.

More specifically, first, the aqueous liquid of the zirconium-containing oxide is prepared by mixing the zirconium-containing oxide containing at least one element selected from the group consisting of calcium, lanthanum, cerium, neodymium and yttrium, and zirconium with water. In this case, a pH of the aqueous liquid of the zirconium-containing oxide is preferably neutral or alkaline. Particularly, the pH of the aqueous liquid of the zirconium-containing oxide is preferably between 7 and 10.

Next, rhodium salt and water are mixed to prepare an aqueous solution of the rhodium salt. Similarly, a pH of the aqueous solution of the rhodium salt is preferably neutral or alkaline. The rhodium salt is preferably hexammine rhodium salt, more preferably hexammine rhodium (III) chloride ([Rh(NH$_3$)$_6$]Cl$_3$). For example, the aqueous solution of the hexammine rhodium salt has a pH of 11.7, which is favorable in the manufacturing method of the present invention. Each pH of the aqueous liquid and the aqueous solution can be measured by using a commercially available pH meter.

Next, the aqueous liquid of the zirconium-containing oxide is mixed with the aqueous solution of the rhodium salt by stirring, thereby supporting rhodium on the zirconium-containing oxide. Then, the aqueous liquid of the zirconium-containing oxide in which rhodium is supported on the surface thereof is dried and baked. Thus, the zirconium-containing oxide in which rhodium is highly dispersed can be obtained.

Next, the rhodium-supporting zirconium-containing oxide, water, and a binder are mixed so as to prepare a slurry. The slurry is applied to the inside of the honeycomb substrate, followed by drying and baking, thereby obtaining a honeycomb catalyst. Then, the honeycomb catalyst is impregnated with an aqueous solution of the NOx absorbing material, followed by drying, thereby obtaining the exhaust gas purifying catalyst according to the present invention. The other components other than rhodium, the zirconium-containing oxide and the NOx absorbing material, such as platinum, cerium and alumina, are preferably mixed with the slurry together with the zirconium-containing oxide.

As described above, rhodium can be highly dispersed on the zirconium-containing oxide by controlling the pH of the mixed liquid of the aqueous solution of the rhodium salt and the aqueous liquid of the zirconium-containing oxide to be 7 or more. The mechanism may be as follows. When the zirconium-containing oxide is dispersed or dissolved in water, the aqueous liquid thus obtained has a pH of 7 or more. If such an aqueous liquid is mixed with an acidic aqueous solution (particularly pH of 1.2) such as rhodium nitrate commonly used as a rhodium source, aggregates of rhodium are formed because of contact of acid with alkali. As a result, a high degree of dispersion of rhodium may not be achieved. On the other hand, even if the neutral or alkaline aqueous solution of the rhodium salt is mixed with the aqueous liquid of the zirconium-containing oxide, the aggregations of rhodium are not easily formed since the pH is not greatly changed. Therefore, rhodium can be highly dispersed on the surface of the zirconium-containing oxide.

For example, when lanthanum-added zirconia (La—ZrO$_2$) is mixed with an acid aqueous solution, lanthanum elution in La—ZrO$_2$ is promoted. As a result, the amount of lanthanum in zirconia decreases, and a heat resistance of zirconia is deteriorated. Accordingly, rhodium is aggregated or buried because of the aggregation of zirconia after being subjected to load at high temperature, and thus, the NOx purification performance is deteriorated. In view of this, in the manufacturing method of the present invention, it is important to avoid contact of acid with alkali or prevent contact to a minimum when supporting rhodium by the impregnation method. Therefore, the aqueous solution of the rhodium salt and the aqueous liquid of the zirconium-containing oxide are preferably mixed so that the liquid and the solution have the pH of 7 or more. Note that, the technical scope of the present invention is not to be limited to the embodiment in which effects are achieved by the above-described mechanism.

EXAMPLE

The following is a further description of the present invention referring to examples and comparative examples. However, the present invention is not limited to these examples.

Example 1

First, commercially available lanthanum-added zirconia (La—ZrO$_2$) was put into ion-exchange water and mixed so as to prepare an aqueous liquid of lanthanum-added zirconia. A molar ratio of lanthanum to zirconia in the above-mentioned lanthanum-added zirconia was 1:99. Then, a certain amount of an aqueous solution of hexammine rhodium was added to the aqueous liquid of lanthanum-added zirconia so that a rhodium supporting concentration was adjusted to 0.18% by mass, followed by stirring. Then, the mixed liquid of the aqueous liquid of lanthanum-added zirconia and the rhodium aqueous solution was dried and baked at 400° C. for one hour, so as to prepare a rhodium-supporting lanthanum-added zirconia powder.

Next, the obtained rhodium-supporting lanthanum-added zirconia powder, boehmite, nitric acid and ion-exchange water were put into a magnetic pot, and shaken with alumina balls, thereby obtaining slurry. A ceramic honeycomb substrate (400 cells/6 mils, 0.119 L) was impregnated with the slurry. Then, redundant slurry adhered to the honeycomb substrate was removed by airflow, followed by drying at 120° C. and baking at 400° C. in airflow, so as to obtain a honeycomb catalyst of this example. The coating amount of the catalyst layer was 400 g/L, and the rhodium supporting amount was 0.7 g/L in the honeycomb catalyst of this example.

Then, a predetermined amount of barium (Ba) as a NOx absorbing material was supported on the obtained honeycomb catalyst, followed by drying at 120° C. and baking at 400° C. in airflow, so as to obtain an exhaust gas purifying catalyst of this example. The barium supporting amount in the exhaust gas purifying catalyst of this example was 28 g/L as barium oxide (BaO). Table 1 shows the type of noble metal in the catalyst, the aqueous solution of rhodium to be used, the rhodium supporting concentration in the catalyst, the composition of the carrier supporting rhodium thereon and the type of the NOx absorbing material. Table 2 shows the degree of dispersion of rhodium measured by the method described later, the pH of the aqueous liquid in which the carrier that supports rhodium is dispersed, and the pH of the mixed liquid of the carrier that supports rhodium and the rhodium salt aqueous solution.

Example 2

Similar operations to those of Example 1 were repeated except that magnesium (Mg) was used as the NOx absorbing material instead of barium (Ba), thereby obtaining an exhaust gas purifying catalyst of this example. The catalyst specification of Example 2 is shown in Table 1. The degree of dispersion of rhodium and the like of Example 2 are shown in Table 2. The magnesium supporting amount in the exhaust gas purifying catalyst of this example was 10 g/L as magnesium oxide (MgO).

Example 3

Similar operations to those of Example 1 were repeated except that sodium (Na) was used as the NOx absorbing material instead of barium (Ba), thereby obtaining an exhaust gas purifying catalyst of this example. The catalyst specification of Example 3 is shown in Table 1. The degree of dispersion of rhodium and the like of Example 3 are shown in Table 2. The sodium supporting amount in the exhaust gas purifying catalyst of this example was 5 g/L as sodium oxide ($Na_2O$).

Example 4

Similar operations to those of Example 1 were repeated except that potassium (K) was used as the NOx absorbing material instead of barium (Ba), thereby obtaining an exhaust gas purifying catalyst of this example. The catalyst specification of Example 4 is shown in Table 1. The degree of dispersion of rhodium and the like of Example 4 are shown in Table 2. The potassium supporting amount in the exhaust gas purifying catalyst of this example was 5 g/L as potassium oxide ($K_2O$).

Example 5

Similar operations to those of Example 1 were repeated except that cesium (Cs) was used as the NOx absorbing material instead of barium (Ba), thereby obtaining an exhaust gas purifying catalyst of this example. The catalyst specification of Example 5 is shown in Table 1. The degree of dispersion of rhodium and the like of Example 5 are shown in Table 2. The cesium supporting amount in the exhaust gas purifying catalyst of this example was 20 g/L as cesium oxide ($Cs_2O$).

Example 6

Similar operations to those of Example 1 were repeated except that commercially available calcium-added zirconia (Ca—$ZrO_2$) was used instead of lanthanum-added zirconia, thereby obtaining an exhaust gas purifying catalyst of this example. The catalyst specification of Example 6 is shown in Table 1. The degree of dispersion of rhodium and the like of Example 6 are shown in Table 2. A molar ratio of calcium to zirconia in the above-mentioned calcium-added zirconia was 1:99.

Example 7

Similar operations to those of Example 1 were repeated except that commercially available cerium-added zirconia (Ce—$ZrO_2$) was used instead of lanthanum-added zirconia, thereby obtaining an exhaust gas purifying catalyst of this example. The catalyst specification of Example 7 is shown in Table 1. The degree of dispersion of rhodium and the like of Example 7 are shown in Table 2. A molar ratio of cerium to zirconia in the above-mentioned cerium-added zirconia was 1:99.

Example 8

Similar operations to those of Example 1 were repeated except that commercially available neodymium-added zirconia (Nd—$ZrO_2$) was used instead of lanthanum-added zirconia, thereby obtaining an exhaust gas purifying catalyst of this example. The catalyst specification of Example 8 is shown in Table 1. The degree of dispersion of rhodium and the like of Example 8 are shown in Table 2. A molar ratio of neodymium to zirconia in the above-mentioned neodymium-added zirconia was 1:99.

Example 9

Similar operations to those of Example 1 were repeated except that commercially available yttrium-added zirconia (Y—$ZrO_2$) was used instead of lanthanum-added zirconia, thereby obtaining an exhaust gas purifying catalyst of this example. The catalyst specification of Example 9 is shown in Table 1. The degree of dispersion of rhodium and the like of Example 9 are shown in Table 2. A molar ratio of yttrium to zirconia in the above-mentioned yttrium-added zirconia was 1:99.

Comparative Example 1

Similar operations to those of Example 1 were repeated except that commercially available alumina ($Al_2O_3$) was used instead of lanthanum-added zirconia, thereby obtaining an exhaust gas purifying catalyst of this example. The catalyst specification of Comparative Example 1 is shown in Table 1. The degree of dispersion of rhodium and the like of Comparative Example 1 are shown in Table 2.

Comparative Example 2

Similar operations to those of Example 1 were repeated except that commercially available zirconia ($ZrO_2$) not containing additive elements was used instead of lanthanum-added zirconia, thereby obtaining an exhaust gas purifying catalyst of this example. The catalyst specification of Comparative Example 2 is shown in Table 1. The degree of dispersion of rhodium and the like of Comparative Example 2 are shown in Table 2.

Example 10

Similar operations to those of Example 1 were repeated except that La (0.5)-$ZrO_2$ (99.5) was used instead of La (1)-

$ZrO_2$ (99), thereby obtaining an exhaust gas purifying catalyst of this example. The catalyst specification of Example 10 is shown in Table 1. The degree of dispersion of rhodium and the like of Example 10 are shown in Table 2. La (0.5)-$ZrO_2$ (99.5) represents lanthanum-added zirconia in which a molar ratio of lanthanum to zirconia is 0.5:99.5.

Example 11

Similar operations to those of Example 1 were repeated except that La (5)-$ZrO_2$ (95) was used instead of La (1)-$ZrO_2$ (99), thereby obtaining an exhaust gas purifying catalyst of this example. The catalyst specification of Example 11 is shown in Table 1. The degree of dispersion of rhodium and the like of Example 11 are shown in Table 2. La (5)-$ZrO_2$ (95) represents lanthanum-added zirconia in which a molar ratio of lanthanum to zirconia is 5:95.

Example 12

Similar operations to those of Example 1 were repeated except that the rhodium supporting concentration was 0.06% by mass, thereby obtaining an exhaust gas purifying catalyst of this example. The catalyst specification of Example 12 is shown in Table 1. The degree of dispersion of rhodium and the like of Example 12 are shown in Table 2.

Example 13

Similar operations to those of Example 1 were repeated except that the rhodium supporting concentration was 0.36% by mass, thereby obtaining an exhaust gas purifying catalyst of this example. The catalyst specification of Example 13 is shown in Table 1. The degree of dispersion of rhodium and the like of Example 13 are shown in Table 2.

Example 14

The rhodium-supporting lanthanum-added zirconia powder was prepared in a similar manner to Example 1. Then, a predetermined amount of platinum was supported on commercially available cerium-added alumina (Ce (20)-$Al_2O_3$), followed by drying and baking at 400° C. for one hour, so as to obtain a platinum-supporting cerium-added alumina powder for an inner layer. In addition, a predetermined amount of platinum was supported on commercially available cerium-added alumina (Ce (20)-$Al_2O_3$), followed by drying and baking at 400° C. for one hour, so as to obtain a platinum-supporting cerium-added alumina powder for a outer layer. Ce (20)-$Al_2O_3$ represents cerium-added alumina in which a molar ratio of cerium to alumina is 20:80.

The obtained platinum-supporting cerium-added alumina powder for the inner layer, boehmite, nitric acid and ion-exchange water were put into a magnetic pot, and shaken with alumina balls, thereby obtaining slurry for the inner layer. Then, the rhodium-supporting lanthanum-added zirconia powder, the platinum-supporting cerium-added alumina powder for the outer layer, boehmite, nitric acid and ion-exchange water were put into a magnetic pot, and shaken with alumina balls, thereby obtaining slurry for the outer layer.

Next, a ceramic honeycomb substrate (400 cells/6 mils, 0.119 L) was impregnated with the slurry for the inner substrate. Then, redundant slurry adhered to the honeycomb substrate was removed, followed by drying at 120° C. and baking at 400° C. in airflow. Next, the honeycomb substrate provided with the inner layer was impregnated with the slurry for the outer layer. Then, redundant slurry adhered to the honeycomb substrate was removed, followed by drying at 120° C. and baking at 400° C. in airflow, so as to obtain a honeycomb catalyst of this example. The coating amount of the catalyst layer was 400 g/L, the total supported amount of noble metal was 4.3 g/L, and a mass ratio of platinum to rhodium was adjusted to 5:1 in the honeycomb catalyst of this example.

Then, a predetermined amount of barium as a NOx absorbing material was supported on the obtained honeycomb catalyst, followed by drying at 120° C. and baking at 400° C. in airflow, so as to obtain an exhaust gas purifying catalyst of this example. Table 1 shows the type of noble metal in the catalyst, the aqueous solution of rhodium to be used, the rhodium supporting concentration in the catalyst, the composition of the carrier supporting rhodium thereon, the composition of the carrier supporting platinum thereon, the type of the NOx absorbing material, the cerium amount in the catalyst and the cerium amount in the outer layer. Table 2 shows the degree of dispersion of rhodium measured by the method described later, the pH of the aqueous liquid in which the carrier that supports rhodium is dispersed, and the pH of the mixed liquid of the carrier that supports rhodium and the rhodium salt aqueous solution.

Example 15

Similar operations to those of Example 14 were repeated except that Ce (12)-$Al_2O_3$ was used instead of Ce (20)-$Al_2O_3$, thereby obtaining an exhaust gas purifying catalyst of this example. The catalyst specification of Example 15 is shown in Table 1. The degree of dispersion of rhodium and the like of Example 15 are shown in Table 2. Ce (12)-$Al_2O_3$ represents cerium-added alumina in which a molar ratio of cerium to alumina is 12:88.

Example 16

Similar operations to those of Example 14 were repeated except that Ce (28)-$Al_2O_3$ was used instead of Ce (20)-$Al_2O_3$, thereby obtaining an exhaust gas purifying catalyst of this example. The catalyst specification of Example 16 is shown in Table 1. The degree of dispersion of rhodium and the like of Example 16 are shown in Table 2. Ce (28)-$Al_2O_3$ represents cerium-added alumina in which a molar ratio of cerium to alumina is 28:72.

Example 17

The rhodium-supporting lanthanum-added zirconia powder was prepared in a similar manner to Example 1. Then, a predetermined amount of platinum was supported on commercially available cerium-added alumina (Ce (22)-$Al_2O_3$), followed by drying and baking at 400° C. for one hour, so as to obtain a platinum-supporting cerium-added alumina powder for an inner layer. In addition, a predetermined amount of platinum was supported on commercially available cerium-added alumina (Ce (14)-$Al_2O_3$), followed by drying and baking at 400° C. for one hour, so as to obtain a platinum-supporting cerium-added alumina powder for a outer layer. Ce (22)-$Al_2O_3$ represents cerium-added alumina in which a molar ratio of cerium to alumina is 22:78. Ce (14)-$Al_2O_3$ represents cerium-added alumina in which a molar ratio of cerium to alumina is 14:86.

Then, the platinum-supporting cerium-added alumina powder for the inner layer, boehmite, nitric acid and ion-exchange water were put into a magnetic pot, and shaken with alumina balls, thereby obtaining slurry for the inner layer. Then, the platinum-supporting cerium-added alumina powder for the outer layer, the rhodium-supporting lanthanum-added zirconia powder, boehmite, nitric acid and ion-exchange water were put into a magnetic pot, and shaken with alumina balls, thereby obtaining slurry for the outer layer.

Next, a ceramic honeycomb substrate (400 cells/6 mils, 0.119 L) was impregnated with the slurry for the inner layer. Then, redundant slurry adhered to the honeycomb substrate was removed, followed by drying at 120° C. and baking at 400° C. in airflow. Next, the honeycomb substrate provided with the inner layer was impregnated with the slurry for the outer layer. Then, redundant slurry adhered to the honeycomb substrate was removed, followed by drying at 120° C. and baking at 400° C. in airflow, so as to obtain a honeycomb catalyst of this example. The coating amount of the catalyst layer was 400 g/L, the total supported amount of noble metal was 4.3 g/L, and a mass ratio of platinum to rhodium was adjusted to 5:1 in the honeycomb catalyst of this example.

Then, a predetermined amount of barium as a NOx absorbing material was supported on the obtained honeycomb catalyst, followed by drying at 120° C. and baking at 400° C. in airflow, so as to obtain an exhaust gas purifying catalyst of this example. The catalyst specification of Example 17 is shown in Table 1. The degree of dispersion of rhodium and the like of Example 17 are shown in Table 2.

Example 18

Similar operations to those of Example 17 were repeated except that Ce (17)-$Al_2O_3$ was used instead of Ce (22)-$Al_2O_3$, and Ce (28)-$Al_2O_3$ was used instead of Ce (14)-$Al_2O_3$, thereby obtaining an exhaust gas purifying catalyst of this example. The catalyst specification of Example 18 is shown in Table 1. The degree of dispersion of rhodium and the like of Example 18 are shown in Table 2. Ce (17)-$Al_2O_3$ represents cerium-added alumina in which a molar ratio of cerium to alumina is 17:83. Ce (28)-$Al_2O_3$ represents cerium-added alumina in which a molar ratio of cerium to alumina is 28:72.

Example 19

Commercially available lanthanum-added zirconia (La—$ZrO_2$) was put into ion-exchange water and mixed so as to prepare an aqueous liquid of lanthanum-added zirconia. A molar ratio of lanthanum to zirconia in the above-mentioned lanthanum-added zirconia was 1:99. Then, a certain amount of an aqueous solution of hexammine rhodium was added to the aqueous liquid of lanthanum-added zirconia so that a rhodium supporting concentration was adjusted to 3% by mass, followed by stirring. Then, the mixed liquid of the aqueous liquid of lanthanum-added zirconia and the rhodium aqueous solution was dried and baked at 400° C. for one hour, so as to prepare a rhodium-supporting lanthanum-added zirconia powder.

Next, platinum was supported on commercially available cerium-added alumina (Ce (20)-$Al_2O_3$) so that a platinum supporting concentration was adjusted to 1.6% by mass, followed by drying and baking at 400° C. for one hour, so as to prepare a platinum-supporting cerium-added alumina powder for an inner layer. Similarly, platinum was supported on commercially available cerium-added alumina (Ce (20)-$Al_2O_3$) so that a platinum supporting concentration was adjusted to 4% by mass, followed by drying and baking at 400° C. for one hour, so as to prepare a platinum-supporting cerium-added alumina powder for a outer layer. Ce (20)-$Al_2O_3$ represents cerium-added alumina in which a molar ratio of cerium to alumina is 20:80.

The obtained platinum-supporting cerium-added alumina powder for the inner layer, boehmite, nitric acid and ion-exchange water were put into a magnetic pot, and shaken with alumina balls, thereby obtaining slurry for the inner layer. Then, the rhodium-supporting lanthanum-added zirconia powder, the platinum-supporting cerium-added alumina powder for the outer layer, boehmite, nitric acid and ion-exchange water were put into a magnetic pot, and shaken with alumina balls, thereby obtaining slurry for the outer layer.

Next, a ceramic honeycomb substrate (400 cells/6 mils, 0.119 L) was impregnated with the slurry for the inner layer. Then, redundant slurry adhered to the honeycomb substrate was removed, followed by drying at 120° C. and baking at 400° C. in airflow. Next, the honeycomb substrate provided with the inner layer was impregnated with the slurry for the outer layer. Then, redundant slurry adhered to the honeycomb substrate was removed, followed by drying at 120° C. and baking at 400° C. in airflow, so as to obtain a honeycomb catalyst of this example. The coating amount of the catalyst layer was 405.5 g/L, the total supported amount of noble metal was 8.5 g/L, and a mass ratio of platinum to rhodium was adjusted to 5:1 in the honeycomb catalyst of this example.

Then, predetermined amounts of barium and cerium as a NOx absorbing material were supported on the obtained honeycomb catalyst, followed by drying at 120° C. and baking at 400° C. in airflow, so as to obtain an exhaust gas purifying catalyst of this example. The barium supporting amount was 28 g/L as barium oxide (BaO), and the cerium supporting amount was 5 g/L as cerium oxide ($CeO_2$) in the exhaust gas purifying catalyst of this example.

Comparative Example 3

Lanthanum-added zirconia (La (1)-$ZrO_2$ (99)) used in Example 1 was put into ion-exchange water and mixed so as to prepare an aqueous liquid of lanthanum-added zirconia. Then, a certain amount of an aqueous solution of rhodium nitrate was added to the aqueous liquid of lanthanum-added zirconia so that a rhodium supporting concentration was adjusted to 1.5% by mass, followed by drying and baking at 400° C. for one hour, so as to prepare a rhodium-supporting lanthanum-added zirconia powder. The aqueous solution of rhodium nitrate used in this example was a commercially available aqueous solution.

Next, a predetermined amount of platinum was supported on Ce (20)-$Al_2O_3$, followed by drying and baking at 400° C. for one hour, so as to prepare a platinum-supporting cerium-added alumina powder for an inner layer. Similarly, a predetermined amount of platinum was supported on commercially available cerium-added alumina (Ce (20)-$Al_2O_3$), followed by drying and baking at 400° C. for one hour, so as to prepare a platinum-supporting cerium-added alumina powder for a outer layer.

The obtained platinum-supporting cerium-added alumina powder for the inner layer, boehmite, nitric acid and ion-exchange water were put into a magnetic pot, and shaken with alumina balls, thereby obtaining slurry for the inner layer. Then, the rhodium-supporting lanthanum-added zirconia powder, the platinum-supporting cerium-added alumina powder for the outer layer, boehmite, nitric acid and ion-exchange water were put into a magnetic pot, and shaken with alumina balls, thereby obtaining slurry for the outer layer.

Next, a ceramic honeycomb substrate (400 cells/6 mils, 0.119 L) was impregnated with the slurry for the inner layer. Then, redundant slurry adhered to the honeycomb substrate was removed, followed by drying at 400° C. in airflow. Next, the honeycomb substrate provided with the inner layer was impregnated with the slurry for the outer layer. Then, redundant slurry adhered to the honeycomb substrate was removed, followed by drying at 120° C. and baking at 400° C. in airflow, so as to obtain a honeycomb catalyst of this example. The coating amount of the catalyst layer was 400 g/L, the total supported amount of noble metal was 4.3 g/L, and a mass ratio of platinum to rhodium was adjusted to 5:1 in the honeycomb catalyst of this example.

Then, a predetermined amount of barium as a NOx absorbing material was supported on the obtained honeycomb catalyst, followed by drying at 120° C. and baking at 400° C. in airflow, so as to obtain an exhaust gas purifying catalyst of this example. The catalyst specification of Comparative Example 3 is shown in Table 1. The degree of dispersion of rhodium and the like of Comparative Example 3 are shown in Table 2.

Comparative Example 4

Lanthanum-added zirconia (La (1)-$ZrO_2$ (99)) used in Example 1 was put and dispersed into ion-exchange water, followed by adjusting the aqueous liquid to pH 6 using nitric acid. Then, a certain amount of an aqueous solution of hexammine rhodium was added to the aqueous liquid adjusted to pH 6 so that a rhodium supporting concentration was adjusted to 1.5% by mass, followed by stirring. Then, the mixed liquid of the aqueous liquid of lanthanum-added zirconia and the rhodium aqueous solution was dried and baked at 400° C. for one hour, so as to prepare a rhodium-supporting lanthanum-added zirconia powder.

Next, a predetermined amount of platinum was supported on. Ce (20)-$Al_2O_3$, followed by drying and baking at 400° C. for one hour, so as to prepare a platinum-supporting cerium-added alumina powder for an inner layer. Similarly, a predetermined amount of platinum was supported on commercially available cerium-added alumina (Ce (20)-$Al_2O_3$), followed by drying and baking at 400° C. for one hour, so as to prepare a platinum-supporting cerium-added alumina powder for a outer layer.

The obtained platinum-supporting cerium-added alumina powder for the inner layer, boehmite, nitric acid and ion-exchange water were put into a magnetic pot, and shaken with alumina balls, thereby obtaining slurry for the inner layer. Then, the rhodium-supporting lanthanum-added zirconia powder, the platinum-supporting cerium-added alumina powder for the outer layer, boehmite, nitric acid and ion-exchange water were put into a magnetic pot, and shaken with alumina balls, thereby obtaining slurry for the outer layer.

Next, a ceramic honeycomb substrate (400 cells/6 mils, 0.119 L) was impregnated with the slurry for the inner layer. Then, redundant slurry adhered to the honeycomb substrate was removed, followed by drying at 120° C. and baking at 400° C. in airflow. Next, the honeycomb substrate provided with the inner layer was impregnated with the slurry for the outer layer. Then, redundant slurry adhered to the honeycomb substrate was removed, followed by drying at 120° C. and baking at 400° C. in airflow, so as to obtain a honeycomb catalyst of this example. The coating amount of the catalyst layer was 400 g/L, the total supported amount of noble metal was 4.3 g/L, and a mass ratio of platinum to rhodium was adjusted to 5:1 in the honeycomb catalyst of this example.

Then, a predetermined amount of barium as a NOx absorbing material was supported on the obtained honeycomb catalyst, followed by drying at 120° C. and baking at 400° C. in airflow, so as to obtain an exhaust gas purifying catalyst of this example. The catalyst specification of Comparative Example 4 is shown in Table 1. The degree of dispersion of rhodium and the like of Comparative Example 4 are shown in Table 2.

TABLE 1

| | Noble Metal | Rhodium Aqueous Solution | Rhodium Supporting Concentration (mass %) | Carrier for Rhodium (molar ratio in parentheses) | Carrier for Platinum (weight ratio in parentheses) | NOx Absorbing Material | Cerium Amount in Catalyst (mass %) | Cerium Amount in Outer Layer (mass %) |
|---|---|---|---|---|---|---|---|---|
| Ex. 1 | Rh | Hexammine Rhodium | 0.18 | La(1)—$ZrO_2$(99) | — | Ba | — | — |
| Ex. 2 | Rh | Hexammine Rhodium | 0.18 | La(1)—$ZrO_2$(99) | — | Mg | — | — |
| Ex. 3 | Rh | Hexammine Rhodium | 0.18 | La(1)—$ZrO_2$(99) | — | Na | — | — |
| Ex. 4 | Rh | Hexammine Rhodium | 0.18 | La(1)—$ZrO_2$(99) | — | K | — | — |
| Ex. 5 | Rh | Hexammine Rhodium | 0.18 | La(1)—$ZrO_2$(99) | — | Cs | — | — |
| Ex. 6 | Rh | Hexammine Rhodium | 0.18 | Ca—$ZrO_2$ | — | Ba | — | — |
| Ex. 7 | Rh | Hexammine Rhodium | 0.18 | Ce—$ZrO_2$ | — | Ba | — | — |
| Ex. 8 | Rh | Hexammine Rhodium | 0.18 | Nd—$ZrO_2$ | — | Ba | — | — |
| Ex. 9 | Rh | Hexammine Rhodium | 0.18 | Y—$ZrO_2$ | — | Ba | — | — |
| Com. Ex. 1 | Rh | Hexammine Rhodium | 0.18 | $Al_2O_3$ | — | Ba | — | — |
| Com. Ex. 2 | Rh | Hexammine Rhodium | 0.18 | $ZrO_2$ | — | Ba | — | — |
| Ex. 10 | Rh | Hexammine Rhodium | 0.18 | La(0.5)—$ZrO_2$(99.5) | — | Ba | — | — |
| Ex. 11 | Rh | Hexammine Rhodium | 0.18 | La(5)—$ZrO_2$(95) | — | Ba | — | — |
| Ex. 12 | Rh | Hexammine Rhodium | 0.06 | La(1)—$ZrO_2$(99) | — | Ba | — | — |
| Ex. 13 | Rh | Hexammine Rhodium | 0.36 | La(1)—$ZrO_2$(99) | — | Ba | — | — |

TABLE 1-continued

| | Noble Metal | Rhodium Aqueous Solution | Rhodium Supporting Concentration (mass %) | Carrier for Rhodium (molar ratio in parentheses) | Carrier for Platinum (weight ratio in parentheses) | NOx Absorbing Material | Cerium Amount in Catalyst (mass %) | Cerium Amount in Outer Layer (mass %) |
|---|---|---|---|---|---|---|---|---|
| Ex. 14 | Rh, Pt | Hexammine Rhodium | 1.5 | La(1)—ZrO$_2$(99) | Ce(20)—Al$_2$O$_3$(80) | Ba | 25 | 25 |
| Ex. 15 | Rh, Pt | Hexammine Rhodium | 1.5 | La(1)—ZrO$_2$(99) | Ce(12)—Al$_2$O$_3$(88) | Ba | 15 | 25 |
| Ex. 16 | Rh, Pt | Hexammine Rhodium | 1.5 | La(1)—ZrO$_2$(99) | Ce(28)—Al$_2$O$_3$(72) | Ba | 35 | 25 |
| Ex. 17 | Rh, Pt | Hexammine Rhodium | 1.5 | La(1)—ZrO$_2$(99) | Ce(22)—Al$_2$O$_3$(78), Ce(14)—Al$_2$O$_3$(86) | Ba | 25 | 20 |
| Ex. 18 | Rh, Pt | Hexammine Rhodium | 1.5 | La(1)—ZrO$_2$(99) | Ce(17)—Al$_2$O$_3$(83), Ce(28)—Al$_2$O$_3$(72) | Ba | 25 | 40 |
| Ex. 19 | Rh, Pt | Hexammine Rhodium | 3.0 | La(1)—ZrO$_2$(99) | Ce(20)—Al$_2$O$_3$(80) | Ba | 26 | 25 |
| Com. Ex. 3 | Rh, Pt | Rhodium Nitrate | 1.5 | La(1)—ZrO$_2$(99) | Ce(20)—Al$_2$O$_3$(80) | Ba | 25 | 25 |
| Com. Ex. 4 | Rh, Pt | Hexammine Rhodium | 1.5 | La(1)—ZrO$_z$(99) | Ce(20)—Al$_2$O$_3$(80) | Ba | 25 | 25 |

TABLE 2

| | Degree of Dispersion of Rhodium | pH of Carrier for Rhodium-Dispersed Aqueous Liquid | pH of Coexistent Aqueous Liquid of Carrier for Rhodium and Rh Aqueous Solution | ηNOx (%) |
|---|---|---|---|---|
| Ex. 1 | 27.6 | 9.6 | 12.8 | 43.6 |
| Ex. 2 | 27.6 | 9.6 | 12.8 | 40.3 |
| Ex. 3 | 27.6 | 9.6 | 12.8 | 41.9 |
| Ex. 4 | 27.6 | 9.6 | 12.8 | 42.7 |
| Ex. 5 | 27.6 | 9.6 | 12.8 | 44.2 |
| Ex. 6 | 24.4 | 9.6 | 12.8 | 39.5 |
| Ex. 7 | 26.4 | 9.6 | 12.8 | 40.6 |
| Ex. 8 | 27.3 | 9.6 | 12.8 | 42.9 |
| Ex. 9 | 25.8 | 9.6 | 12.8 | 43.1 |
| Com. Ex. 1 | 13.4 | 9.6 | 12.8 | 25.7 |
| Com. Ex. 2 | 18.4 | 9.6 | 12.8 | 32.6 |
| Ex. 10 | 26.2 | 9.6 | 12.8 | 40.7 |
| Ex. 11 | 25.4 | 9.6 | 12.8 | 42.9 |
| Ex. 12 | 46.8 | 9.6 | 12.8 | 42.7 |
| Ex. 13 | 23.1 | 9.6 | 12.8 | 40.7 |
| Ex. 14 | 23.4 | 9.6 | 12.8 | 73.5 |
| Ex. 15 | 23.4 | 9.6 | 12.8 | 70.5 |
| Ex. 16 | 23.4 | 9.6 | 12.8 | 72.4 |
| Ex. 17 | 23.4 | 9.6 | 12.8 | 71.8 |
| Ex. 18 | 23.4 | 9.6 | 12.8 | 72.6 |
| Ex. 19 | 21.8 | 9.6 | 12.8 | 75.3 |
| Com. Ex. 3 | 1.5 | 9.6 | 4.6 | 60.1 |
| Com. Ex. 4 | 3.2 | 6 | 3.2 | 63.1 |

[Performance Evaluation]

(1) Degree of Dispersion of Rhodium

The degree of dispersion of rhodium in the exhaust gas purifying catalyst in each example was calculated from the absorption amount of carbon monoxide. Table 2 shows the degree of dispersion of rhodium in the catalyst in each example. The degree of dispersion of rhodium was measured by the following steps using a metal dispersion measurement device, BEL-METAL-3, manufactured by BEL JAPAN, INC.

First, the rhodium-supporting zirconia powder or the rhodium-supporting alumina powder in each example was baked in a baking furnace at 900° C. in air for three hours. The baked powder in each example was heated to 400° C. by 10° C./min. in He-100% gas flow, followed by being subjected to oxidation treatment at 400° C. for 15 minutes in O$_2$-100% gas flow. Then, the oxidized powder was purged by He-100% gas for 5 minutes, followed by being subjected to reduction treatment at 400° C. for 15 minutes in H$_2$-40%/He balance gas flow. The reduced powder was cooled to 50° C. in He-100% gas flow, followed by allowing CO-10%/He balance gas to flow thereinto in a pulsed state. Thus, the degree of dispersion of rhodium was obtained from the absorption amount of carbon monoxide according to the following formula (1). The unit absorption amount was obtained by the following formula (2).

$$\text{Degree of dispersion (\%)} = \frac{100 \times \text{supported metal atomic weight} \times \text{unit absorption amount}}{22414 \times \text{stoichiometric ratio} \times \text{supported metal content ratio}} \quad \text{[Formula 1]}$$

$$\text{Unit absorption amount (cm}^3\text{/g)} = \frac{\text{total absorption amount}}{\text{sample weight}} \quad \text{[Formula 2]}$$

(2) NOx Purification Rate

Duration Condition

First, the exhaust gas purifying catalyst of each example was installed rearward in a 3.5 L V6 cylinder engine manufactured by NISSAN MOTOR CO., LID. Then, by adjusting a catalyst inlet temperature to 700° C., a duration treatment was performed for 50 hours under an exhaust gas atmosphere. The used fuel was an unleaded gasoline.

Evaluation Condition

The exhaust gas purifying catalyst of each example was cut so as to have the catalyst content of 40 cc. Then, the cut catalyst in each example was evaluated by using a laboratory evaluation device. The laboratory evaluation device was adjusted to have gas species and concentrations shown in Table 3, followed by evaluating each example by shifting from a lean condition (60 seconds) to a rich condition (4 seconds). The evaluation temperature (catalyst inlet temperature) was 300° C. The NOx purification rate (ηNOx) was calculated according to the following formula (3). The obtained result is also shown in Table 2.

$$\eta\text{NOx (\%)} = \frac{A - B}{A} \quad \text{[Formula 3]}$$

A: nitrogen oxide amount at catalyst inlet when lean and rich

B: nitrogen oxide amount at catalyst outlet when lean and rich

TABLE 3

| Gas Species | Gas Concentration | |
|---|---|---|
| | Lean | Rich |
| NO | 100 ppm | 100 ppm |
| CO | 0% | 1.5% |
| $H_2$ | 0% | 0.5% |
| $O_2$ | 4.0% | 0% |
| $C_3H_6$ | 0% | 3000 ppmC |
| $CO_2$ | 9% | 9% |
| $H_2O$ | 10% | 10% |
| $N_2$ | Balance | Balance |

* The reaction gas flow rate was adjusted to 40 L/min.

As shown in Table 2, it is recognized that the NOx purification rates in Examples 1 to 9 that are the exhaust gas purifying catalysts according to the present invention are substantially improved compared with Comparative Examples 1 and 2. This may be because the degrees of dispersion of rhodium in Examples 1 to 9 are higher than those in Comparative Examples 1 and 2. In particular, since the catalysts in Examples 1 to 9 have 20% or more of the degrees of dispersion of rhodium compared with Comparative Example 2, it is recognized that the aggregation of zirconium per se can be suppressed in addition to rhodium by adding the above-mentioned additive elements to zirconium.

When comparing Examples 1, 10 and 11, it is recognized that the generation of lanthanum oxide can be prevented while the aggregation of zirconia is suppressed so as to enhance the catalyst activity, by setting the content ratio of zirconium to lanthanum to the range of 99.5:0.5 to 95:5 in a molar basis.

When comparing Example 1 with Examples 14 to 18, it is recognized that the NOx purification rate can be substantially improved by including platinum and ceria in the catalyst. This may be because the NOx reduction is promoted due to the catalyst activity of platinum supported on cerium in addition to the catalyst activity of highly dispersed rhodium.

On the other hand, when comparing Examples 14 to 18 with Comparative Examples 3 and 4, even if platinum and ceria are contained in the catalyst, the aggregation of rhodium is caused when the pH of the liquid in which the rhodium-supporting carrier and the rhodium salt aqueous solution are mixed is acidic, and as a result, the NOx purification rate is decreased. Accordingly, the pH of the liquid in which the rhodium-supporting carrier and the rhodium salt aqueous solution are mixed is adjusted to 7 or more so that rhodium is highly dispersed and the catalyst activity is improved.

The entire content of Japanese Patent Application No. P2008-224272 (filed on Sep. 2, 2008) is herein incorporated by reference.

Although the invention has been described above by reference to the embodiment and examples of the invention, the invention is not limited to the embodiment and examples described above, and it will be apparent to these skilled in the art that various modifications and changes can be made.

INDUSTRIAL APPLICABILITY

According to the manufacturing method in the present invention, the exhaust gas purifying catalyst in which rhodium is highly dispersed can be obtained. In addition, the used amount of the catalyst components can be reduced since the catalyst performance is not easily deteriorated even after being subjected to load.

| REFERENCE SIGNS LIST | |
|---|---|
| 1 | Monolithic substrate |
| 2 | Catalyst layer (inner layer) |
| 3 | Catalyst layer (outer layer) |

The invention claimed is:

1. An exhaust gas purifying catalyst, comprising:
rhodium;
a zirconium-containing oxide which supports rhodium, and comprises: at least one element selected from the group consisting of calcium, lanthanum, cerium, neodymium and yttrium; and zirconium; and
a NOx absorbing material comprising at least one selected from the group consisting of magnesium, barium, sodium, potassium and cesium,
wherein a degree of dispersion of rhodium is 20% or more after baking at 900° C. in air for three hours.

2. The exhaust gas purifying catalyst according to claim 1, wherein the zirconium-containing oxide comprises zirconium and lanthanum, and
a content ratio of zirconium to lanthanum is 99.5:0.5 to 95:5 in a molar basis.

3. The exhaust gas purifying catalyst according to claim 1, wherein a supported amount of rhodium is 3% by mass or less.

4. The exhaust gas purifying catalyst according to claim 1, further comprising:
platinum,
wherein platinum is supported on an oxide containing cerium and aluminum, and at least some platinum is supported on cerium.

5. The exhaust gas purifying catalyst according to claim 4, wherein a plurality of catalyst layers are provided,
a content of cerium contained in the catalyst layers is 20 to 40% by mass as ceria ($CeO_2$), and
a content of ceria contained in an outermost layer in the plurality of the catalyst layers is 20 to 40% by mass with respect to a total content of ceria.

6. The exhaust gas purifying catalyst according to claim 1, wherein the zirconium-containing oxide has zirconia particles, and rhodium is present in a grain boundary formed between the zirconia particles.

7. The exhaust gas purifying catalyst according to claim 1, wherein a content ratio of zirconium to the element is 99.5:0.5 to 95:5 in a molar basis.

* * * * *